2,868,781

CARBOHYDRATE ESTERS OF CARBOXYLIC ACIDS AND METHODS OF PREPARING SAME

Van R. Gaertner and Edward L. Doerr, Dayton, Ohio, assignors to Monsanto Chemical Company, St. Louis, Mo., a corporation of Delaware No Drawing. Application April 23, 1956
Serial No. 579,719

18 Claims. (Cl. 260—234)

The present invention is directed to biscarbohydrate dicarboxylic acid esters as new compounds and as new surfactants. The invention is also directed to a method of preparing these new compounds by an ester exchange reaction between a diester of a dicarboxylic acid, and an amount of carbohydrate equal to or greater than that required to form the biscarbohydrate compound.

An object of the present invention is to provide valuable surfactants and a method of making such surfactants from carbohydrates—an abundant and inexpensive raw material.

The term "carbohydrate" as used herein is intended to include the sugar alcohols, i. e., the polyols such as sorbitol, as well as the sugars, starches, dextrans, etc.

In the past, some surface active agents have been prepared by acylating sugars, e. g., sucrose, with monocarboxylic acids. These products were usually mono-acyl carbohydrates, although the di-acyl products were also sometimes prepared. However, it has now been discovered that different and improved products can be prepared by esterifying two carbohydrate molecules with a single dicarboxylic acid molecule.

Our new compounds include the biscarbohydrate esters of aliphatic dicarboxylic acids having a straight chain of 1 to 8 carbon atoms between the carboxyl groups. Such acids include adipic acids, succinic acids, glutaric acids, malonic acids, pimelic acids, suberic acids, and sebacic acids. It is preferred that the acid have a hydrocarbon or oxahydrocarbon side chain of about 5 to 20 or more carbon atoms. It is also preferred that the acid be an $\alpha,\beta$-dicarboxylic acid, i. e., that carboxyl groups be attached to adjacent carbon atoms. The aliphatic side chain group of the acid in our preferred materials can be an alkyl group, an alkylene group, or an alkoxy group. Particularly suitable acids can be prepared by condensing compounds of about 5 to 20 carbon atoms such as monoolefins, alkyl chlorides, or aliphatic alcohols with $\alpha,\beta$-unsaturated acid anhydrides or the esters thereof in the manner described in Patents No. 2,283,214 and No. 2,380,699 to Lucas P. Kyrides. It is particularly preferred to use the condensation products of olefins such as diisobutylene, triisobutylene, tetraisobutylenes, or tetrapropylenes, etc., with maleic acid or maleic anhydride. The aforenamed polyalkylenes can, for example, be prepared by polymerization of isobutylene or propylene with sulfuric acid or metallic halides, or result from simultaneous dehydration and polymerization of tertiary butyl alcohol or isopropyl alcohol by concentrated sulfuric acid. The products of the olefin and maleic acid or maleic anhydride condensation can be represented by the formula:

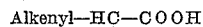
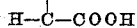

in which "Alkenyl—" represents the olefinic residue, e. g., the triisobutylene residue; the olefinic unsaturation is retained in the residue. Such mono-alkenyl-succinic acids, especially in the form of their diethyl or dimethyl esters, can be readily converted to biscarbohydrate mono-alkenyl-succinates. It is preferred that the aliphatic side chain on the acids for conversion to biscarbohydrate esters be located on an $\alpha$-carbon atom, i. e., on a carbon atom adjacent to a carboxyl group.

The carbohydrate portion of our biscarbohydrate esters of dicarboxylic acids is composed of a sugar, a starch, a dextran, a polyol, or mixtures of the foregoing, e. g., a ketose, aldose, $\alpha$- or $\beta$-glycoside, disaccharide, polysaccharide, etc., such as glucose, fructose, methyl-$\alpha$-D-glucoside, sorbitol, sucrose and similar materials. It is preferred that the carbohydrate portion be formed from a ketopentose or a ketohexose; or from a glycoside derivative of a sugar, particularly a glycoside of a pentose or hexose; or from a reducing or non-reducing disaccharide. Among such materials are D-fructose, L-sorbose, sucrose, maltose, lactose, L-xylulose, $\alpha$-methyl D-glucoside, $\beta$-methyl D-glucoside, $\beta$-methylfructoside, $\gamma$-methyl glucoside, $\gamma$-methyl L-fructoside, etc. The di-ester compounds formed from polyols such as sorbitol, D-mannitol, D-arabitol, xylitol, etc. are also very useful surfactants.

While, in general, any carbohydrate can be used for the carbohydrate portion of our new compounds, those compounds in which the carbohydrate portion is a sugar or a sugar alcohol have greater solubility in water and otherwise have more useful surfactant properties. Such sugars or sugar alcohols are polyhydric alcohols, usually containing at least four hydroxyl groups and having all of their carbon atoms attached to at least one oxygen atom. The individual carbohydrate portions of our preferred compounds ordinarily do not have a molecular weight greater than about 500; the total molecular weight of our new compounds is ordinarily less than 1500.

Our new compounds are essentially monomeric in character; i. e., each carbohydrate portion is chemically bonded to only one dicarboxylic acid residue. Because of the greater reactivity of the primary hydroxyl groups of the carbohydrates, together with the usual use of a large excess of carbohydrate, there is little tendency to form polymers; similarly, there is little tendency for the dibasic acids to form a diester with a single carbohydrate molecule. Even when the carbohydrate has three primary hydroxyls, as is the case with sucrose, it is believed that for the most part the acid esterifies with only one hydroxyl, the primary hydroxyl on the glucose end of the moiety, and the biscarbohydrate ester is formed.

The new compounds of our invention conform to the formula:

in which S and S' are carbohydrate groups and X is the non-carboxyl portion of a dicarboxylic acid.

In addition to succinic acids other dicarboxylic acids with an alkenyl side chain of the type described above can readily be formed and can be used in preparing our biscarbohydrate esters. Any of the above named dibasic acids which are so substituted with an alkenyl group can be used to prepare our biscarbohydrate esters. In addition, any of the above-named acids containing an alkyl, alkenyl, or alkoxy substituent of about 5 to 20 carbon atoms on any non-carbonyl carbon atom of the acid can be used in preparing our bis-carbohydrate compounds having good surface active properties. It is preferred that the hydrocarbon or oxahydrocarbon side chains on the acid residue portion of our biscarbohydrate esters be highly branched in order to enhance surfactant properties, but straight chain substituents can also be used. A few examples of the dicarboxylic acids which can constitute the acid portion of our compounds are: diisobutenylsuccinic acid, α-diisobutenylmalonic acid, β-triisobutenyl-malonic acid, n-decylsuccinic acid, tetrapropylenesuccinic acid, 3-dodecylhexan-1,6-dioic acid, tridecyloxysuccinic acid, isooctyloxysuccinic acid, 4-octyldecan-1,10-dioic acid, 3-hexyl-8-methyloctandioic acid, tetraisobutenylsuccinic acid, 3-hexadecylpentan-1,5-dioic acid, α-triisobutyl-enesuberic acid, eicosylsuccinic acid, etc. Some examples of our new compounds which contain residues of these acid are: disorbityl diisobutenylmalonate, disorbityl n-decylsuccinate, bis(β-methylfructoside) tetrapropenylsuccinate, bismaltose tridecyloxysuccinate, bis(L-sorbose) tetraisobutenylsuccinate, bis(D-mannitol) eicosylsuccinate, bis-glucose 3-hexadecylpentan-1,5-dioic acid, bis-sucrose 4-octyl-decan-1,10-dioic acid, etc.

Our novel biscarbohydrate esters will have their desirable surfactant properties regardless of the method of preparation. However, the process of the present invention is a very practical and advantageous method particularly suited to the preparation of biscarbohydrate compounds from ketoses, sugar alcohols, disaccharides and glycosides; the process involves an ester interchange reaction between a di-ester, preferably a lower alkyl di-ester of the dicarboxylic acid and the ketose, sugar alcohol, disaccharide or glycoside. Our ester interchange reaction is catalyzed by the presence of alkali or other alkaline or basic materials, e. g., $K_2CO_3$, benzyltrimethylammonium hydroxide, sodium methoxide, sodium ethoxide, sodium carbonate, potassium hydroxide, tribasic sodium phosphate, calcium hydroxide, magnesium hydroxide, etc. The reaction is preferably conducted in dimethylformamide as the solvent, as dimethylformamide is a very good solvent for sucrose and other sugars. Pyridine can also be used as the solvent, but the results are not as good. Dimethylsulfoxide can be used in some instances. Other organic solvents which are good solvents for both the dicarboxylic acid and the carbohydrate can be used, basic or amine type solvents being most suitable. The concentrations of reactants in the solvents can be varied considerably, e. g., with dimethyl formamide as solvent, concentrations of the order of 150 to 400 grams of carbohydrate and dicarboxylic acid reactants per 1000 ml. of solvent are suitable, and similar ranges can be used in other solvents.

It is surprising that the process of the present invention makes it possible to form esters of sugars or sugar alcohols with dicarboxylic acids, in which only one of the sugar or sugar alcohol hydroxyls is esterified. Prior art workers reported some difficulty in preventing monocarboxylic acids from esterifying two or more hydroxyl groups of sugar molecules; it is surprising, therefore, that in the present process the dicarboxylic acids esterify only one of the sugar hydroxyls, and the bis-sugar dicarboxylates are obtained in good yield.

In the process of the present invention it is preferred to use a large excess of carbohydrate over the stoichiometric amount, e. g., 3 to 8 moles of carbohydrate for each mole of dicarboxylic acid ester; about 6 moles of carbohydrate per mole of dicarboxylic acid ester is preferred. The reaction is brought about by heating the materials to about 50° to 130° C. for about 10 to 30 hours, preferably at 85 to 115° C. for 15 to 25 hours. Hexane, heptane, 2,5-dimethylhexane, benzene, or a similar organic solvent is preferably included in the reaction mixture to aid in the removal by distillation during the reaction of methanol or other alcohol which is formed in the trans-esterification reaction.

While it is preferred to use the dimethyl or diethyl esters of the dicarboxylic acids in the trans-esterification reaction, any of the lower hydrocarbon diesters can be used, e. g., diesters in which the hydrocarbon group has 1 to 6 carbon atoms.

The following examples illustrate certain specific embodiments of our invention.

EXAMPLE 1

A 129 gram portion of sucrose (0.377 mole) in 425 ml. of dimethylformamide was heated and stirred at 90° C. to form a homogeneous solution. Dimethyl triisobutenylsuccinate, 18.9 grams (0.06 mole) and 1 gram of $K_2CO_3$ were added. Hexane, 75 ml., was added and the reaction mixture was refluxed at a pot temperature of 95° C. After 18 hours, the pot temperature had risen to 107° and 3.4 grams of methanol had distilled off. The solvents were removed by heating under vacuum, leaving a light tan, gummy material completely soluble in water. The bis-sucrose triisobutenylsuccinate dissolves and foams well in hard or soft water, or in saturated sodium chloride solution. A solution of 1 part of the compound in 4 parts of saturated salt water does not become turbid or otherwise separate upon heating to boiling, and retains its foaming capacity when again cooled.

In the above example, as well as in the following examples, a phase-separating still head was used during the reflux period to remove the methanol-hexane azeotrope as formed.

EXAMPLE 2

In 300 ml. of dimethylformamide was dissolved 68.7 grams (0.377 mole) of sorbitol by heating and stirring. Dimethyl triisobutenylsuccinate, 18.9 grams, 1.0 gram of $K_2CO_3$, and 80 ml. hexane were added and the mixture was heated to reflux at a pot temperature of 90–95° C. and allowed to reflux for 20 hours. The solvents were distilled off under vacuum to leave a fairly mobile, light tan syrup which was oven-dried overnight at 75° C. to 90.5 grams of solid disorbityl triisobutenylsuccinate product. As the theoretical yield of the linear, monomeric disorbityl succinate is 36.8 grams, the maximum active material in the product is $$\frac{36.8}{90.5}=40.7\%$$

EXAMPLE 3

Dimethyl triisobutenylsuccinate, 18.9 grams, was added to a solution at 95° C. of 73 grams of methyl α-D-glucoside in 300 ml. of dimethylformamide. $K_2CO_3$, 1 gram, and 80 ml. hexane were added and the mixture was refluxed at a pot temperature of 95–100° C. The refluxing was continued for 20 hours during which the methanol-hexane azeotrope was distilled over. The solvents were driven off under vacuum to leave 89 grams of a dark tan product. A portion of this crude product, 19 grams, was removed and foamed well when added to water.

The rest of the crude product was dissolved in 300 ml. n-butanol and 100 ml. water by warming and stirring at temperatures less than 40° C., and the product was then salted out by the addition of 30 ml. of saturated sodium chloride solution and separated. The procedure was repeated several times, finally using about a 5% salt solution. The combined butanol layers were dried with saturated salt solution and then sodium sulfate, and the butanol was removed by heating under vacuum at temperatures below 50° C., leaving 40 grams of tan, gummy residue. A 21-gram portion of this residue was oven dried to give 16 grams of bis(methyl-α-D-glucoside) triisobutenylsuccinate. This yield corresponds to 38.8 grams which would have been obtained if all the crude material were purified, or 102% of theory. The purified product gave the following analysis:

Calc'd. for: C, 56.6; H, 8.24. Found: C, 57.37; H, 8.62.

The methyl α-D-glucoside used in the above procedure was of 99% minimum purity and had a melting point of 168° C.

The following table shows the wetting times for some of the surfactant compositions of the present invention.

Table I

| Wetting Agent | Wetting Time in Seconds | | | |
|---|---|---|---|---|
| | 0.5% | 0.25% | 0.125% | 0.0625% |
| 1. Bis-sucrose triisobutenylsuccinate (38.9% max. active) | 3.9 | 6.8 | 13.1 | -------- |
| 2. Bis-disorbityl triisobutenylsuccinate (41% max. active) | 3.4 | 7.7 | 17.7 | 94.9 |
| 3. Bis-(methyl α-D-glucoside) triisobutenylsuccinate; purified | 3.8 | 6.2 | 11.0 | 33.7 |
| 4. Bis-(methyl α-D-glucoside) triisobutenylsuccinate (43% active) | 5.0 | 6.5 | 12.7 | 69.1 |

The values recorded are the times necessary for a 1.5 gram weight to cause a 5 gram skein of cotton yarn to sink in the stated concentrations (percent by grams per milliliter of solution) of the wetting agents in aqueous solution (Draves-Clarkson test, Amer. Dyestuff Reporter, 28, 420–428, Aug. 7, 1939). The concentrations are based on the amounts of active material, i. e., biscarbohydrate ester, in the agents.

In Table II below the foaming ability of the surfactants of the present invention is shown in terms of lather heights as measured by the Ross-Miles test.

Table II

| Bis-carbohydrate ester (0.1% Concentration) | Centimeters of Lather | | | |
|---|---|---|---|---|
| | Soft water (50 p. p. m.) | | Hard water (300 p. p. m.) | |
| | At Once | After 5 Min. | At Once | After 5 Min. |
| Bis-sucrose triisobutenylsuccinate (38.9% max. active) | 4.1 | 3.5 | 2.9 | 2.1 |
| Disorbityl triisobutenylsuccinate (41% max. active) | 9.0 | 8.8 | 9.4 | 8.6 |
| Bis-(methyl α-D-glucoside) triisobutenylsuccinate (purified) | 9.9 | 9.9 | 6.2 | 5.8 |
| Bis-(methyl α-D-glucoside) triisobutenylsuccinate (43% active) | 7.0 | 6.6 | 2.7 | 0.9 |

The 0.1% concentration (grams/milliliter) is based on the amount of active material present.

Our biscarbohydrate dicarboxylic acid esters also have detergent properties.

The data in the tables above demonstrates that our biscarbohydrate dicarboxylic acid esters have surface active properties comparable to and in some cases better than other surface active agents. Another important fact to be considered is that a large part of our surface active agents is composed of a relatively inexpensive carbohydrate material. For example, in bis-sucrose triisobutenylsuccinate, more than two-thirds of the weight of the material is sugar. Thus, if in the tables above the values were based on concentrations of the relatively expensive acid portion of the molecule, alone, the results would appear even better. Another notable feature of one of our surfactants, the bis-sucrose triisobutenylsuccinate, is the fact that it is soluble in saturated salt water and retains its surface active properties in saturated salt water.

Our novel biscarbohydrate dicarboxylic acid ester surfactants can be used as surface active agents, alone, or combined with other surface active materials, or as additives in surface active compositions.

The carbohydrate portion of our surfactants can be obtained from any suitable source and does not have to be chemically pure, e. g., the sucrose can be obtained from extracts of sugar cane, sugar beets, or other plant sources of sucrose.

Biscarbohydrate esters of dicarboxylic acids and their surfactant properties have been described. A method of making biscarbohydrate esters of dicarboxylic acids by reacting a dicarboxylic acid diester with a carbohydrate has been described.

We claim:

1. As new compounds, the biscarbohydrate esters of aliphatic dicarboxylic acids in which the carbohydrate is mono-esterified and in which the carbohydrate is a saccharide containing no more than two saccharide units, and in which the dicarboxylate radical contains from 1 to 8 carbon atoms between the carboxyl groups, and on one of said carbon atoms there is substituted a radical of 5 to 20 carbon atoms.

2. As new compounds, the bis(polyhydric alcohol) esters of an alkenyl succinic acid in which the polyhydric alcohol has at least four free hydroxyl groups prior to esterification and has all of its carbon atoms attached to at least one oxygen atom, and is of formula weight no greater than 500 and in which the alkenyl group contains at least 5 carbon atoms.

3. As new compounds, the bis-sucrose polyisobutenylsuccinates.

4. As a new compound, bis-sucrose triisobutenylsuccinate.

5. As a new compound, disorbityl triisobutenylsuccinate.

6. As a new compound, bis(methyl-α-D-glucoside) triisobutenylsuccinate.

7. A method of preparing biscarbohydrate esters of dicarboxylic acids which comprises heating and reacting a lower hydrocarbon diester of an aliphatic dicarboxylic acid in the presence of a basic catalyst with a carbohydrate which is a saccharide containing no more than two saccharide units selected from the group consisting of ketoses, sugar alcohols, disaccharides, and the glycosides of aldoses and ketoses.

8. The method of claim 7 in which the reaction takes place in dimethylformamide as solvent at a temperature in the range of 85 to 115° C. for 15 to 25 hours, and in which the diester of a dicarboxylic acid is a dialkyl ester, the alkyl groups containing from 1 to 6 carbon atoms.

9. A method of producing a biscarbohydrate ester of a dicarboxylic acid which comprises reacting a dimethyl ester of an aliphatic dicarboxylic acid having from 1 to 8 carbon atoms between the carboxyl groups, and on one of said carbon atoms having substituted a radical of 5 to 20 carbon atoms, in the presence of an alkaline catalyst with a carbohydrate which is a saccharide containing no more than two saccharide units selected from the group consisting of ketoses, sugar alcohols, disaccharides, and the glycosides of aldoses and ketoses, from 3 to 8 moles of said carbohydrate being present for each mole of said dimethyl ester of carboxylic acid, and the reaction being conducted at temperatures in the range of 85 to 115° C. for 15 to 25 hours.

10. The method of claim 9 in which the carbohydrate is sucrose.

11. The method of claim 9 in which the dimethyl ester of a dicarboxylic acid is a dimethyl alkenylsuccinate.

12. The method of claim 11 in which the carbohydrate is sorbitol.

13. The method of claim 11 in which the carbohydrate is methyl-α-D-glucoside.

14. The method of claim 9 in which the acid ester is dimethyl triisobutenylsuccinate, and in which the carbohydrate is a disaccharide.

15. The method of claim 7 in which the carbohydrate is sucrose.

16. The compound of claim 1 in which the carboxyl groups are attached to adjacent carbon atoms in the dicarboxylate radical.

17. The compound of claim 16 in which the carbohydrate is sucrose.

18. The method of claim 9 in which the carboxyl groups in the dicarboxylic acid are attached to adjacent carbon atoms.

References Cited in the file of this patent

UNITED STATES PATENTS

| | | |
|---|---|---|
| 2,613,206 | Caldwell | Oct. 7, 1952 |
| 2,661,349 | Caldwell et al. | Dec. 1, 1953 |

OTHER REFERENCES

"Advances in Carbohydrate Chemistry," Charles R. Fordyce, Academic Press Inc., New York, N. Y., page 320, paragraph 6; vol. I.